: US 8,205,451 B2
(45) Date of Patent: Jun. 26, 2012

(12) United States Patent
Narayan et al.

(54) SYSTEM AND ASSEMBLIES FOR PRE-HEATING FUEL IN A COMBINED CYCLE POWER PLANT

(75) Inventors: Prakash Narayan, Tamil Nadu (IN); Shinoj Vakkayil Chandrabose, Kerala (IN)

(73) Assignee: General Electric Company, Schenectady, NY (US)

( * ) Notice: Subject to any disclaimer, the term of this patent is extended or adjusted under 35 U.S.C. 154(b) by 840 days.

(21) Appl. No.: 12/185,989

(22) Filed: Aug. 5, 2008

(65) Prior Publication Data

US 2010/0031660 A1  Feb. 11, 2010

(51) Int. Cl.
F02C 7/224 (2006.01)

(52) U.S. Cl. .......... 60/736; 60/39.182; 60/734; 122/7 R; 122/7 B; 122/1 B; 122/406.4

(58) Field of Classification Search ............... 60/39.182, 60/734, 736, 772; 122/1 B, 7 R, 7 B, 406.4, 122/448.4
See application file for complete search history.

(56) References Cited

U.S. PATENT DOCUMENTS

| | | | |
|---|---|---|---|
| 3,118,429 A | 1/1964 | Hochmuth | |
| 3,965,675 A | 6/1976 | Martz et al. | |
| 4,353,206 A | 10/1982 | Lee | |
| 4,354,347 A | 10/1982 | Tomlinson et al. | |
| 4,371,027 A | 2/1983 | Jacobsen | |
| 4,829,938 A | 5/1989 | Motai et al. | |
| 4,841,722 A | 6/1989 | Bjorge | |
| 4,961,311 A | 10/1990 | Pavel et al. | |
| 5,267,434 A | 12/1993 | Termuehlen et al. | |
| 5,285,629 A | 2/1994 | Gounder | |
| 5,649,416 A | 7/1997 | Moore | |
| 5,799,481 A | 9/1998 | Fetescu | |
| 6,041,588 A * | 3/2000 | Bruckner et al. | 60/772 |
| 6,134,873 A | 10/2000 | Nakhamkin et al. | |
| 6,145,295 A | 11/2000 | Donovan et al. | |
| 6,167,706 B1 | 1/2001 | Bronicki et al. | |
| 6,173,563 B1 | 1/2001 | Vakil et al. | |
| 6,178,734 B1 | 1/2001 | Shibuya et al. | |
| 6,269,626 B1 * | 8/2001 | Kim | 60/39.182 |
| 6,389,794 B2 | 5/2002 | Ranasinghe et al. | |
| 6,389,797 B1 | 5/2002 | Sugishita et al. | |
| 6,499,302 B1 | 12/2002 | Ranasinghe | |
| 6,608,395 B1 | 8/2003 | Steinway | |
| 6,615,575 B2 | 9/2003 | Liebig | |
| 6,782,703 B2 | 8/2004 | Dovali-Solis | |
| 6,920,760 B2 | 7/2005 | Schottler et al. | |
| 6,957,540 B1 | 10/2005 | Briesch et al. | |
| 7,107,774 B2 | 9/2006 | Radovich | |
| 7,131,259 B2 | 11/2006 | Rollins, III | |
| 7,343,746 B2 | 3/2008 | Pierson | |

* cited by examiner

*Primary Examiner* — Louis Casaregola
*Assistant Examiner* — Steven Sutherland
(74) *Attorney, Agent, or Firm* — Armstrong Teasdale LLP

(57) ABSTRACT

A system and assemblies for pre-heating fuel in a combined cycle power plant are provided. A fuel supply system includes a water heater assembly configured to heat a flow of water using progressively higher grade heat from a multi-stage heat exchanger arrangement. The fuel supply system also includes a fuel heater that includes a first flow path coupled in flow communication with a fuel flow path wherein the fuel heater includes a second flow path coupled in flow communication with a flow path for the flow of water. The fuel heater is configured to transfer heat from the flow of water to the flow of fuel.

20 Claims, 3 Drawing Sheets

SYSTEM AND ASSEMBLIES FOR PRE-HEATING FUEL IN A COMBINED CYCLE POWER PLANT

BACKGROUND OF THE INVENTION

This invention relates generally to power generation systems and, more particularly, to a system and assemblies for pre-heating fuel in a combined cycle power plant.

At least some known power generation systems include a multi-stage heat recovery steam generator (HRSG) configured to generate progressively lower grade steam from each successive stage in the exhaust of a gas turbine engine. Relatively high grade heat at a gas inlet to the HRSG is capable of generating relatively high pressure steam in a high pressure stage or section of the HRSG. After heat is removed from the gas in the high pressure stage the gas is channeled to an intermediate pressure stage where the relatively cooler gas is only capable of generating a relatively lower pressure or intermediate pressure steam.

To increase the efficiency of the combustion in the gas turbine engine the fuel typically preheated. The preheating of the fuel uses one or more water flows from respective HRSG sections to heat the fuel in a multi-stage fuel heater. However, the amount of heat addition to the fuel using the multistage fuel heater is limited.

BRIEF DESCRIPTION OF THE INVENTION

In one embodiment, a system for pre-heating fuel in a combined cycle power plant includes a water heater assembly configured to heat a flow of water using progressively higher grade heat from a multi-stage heat exchanger. The fuel supply system also includes a fuel heater that includes a first flow path coupled in flow communication with a fuel flow path and a second flow path coupled in flow communication with a flow path for the flow of water. The fuel heater is configured to transfer heat from the flow of water to the flow of fuel.

In another embodiment, a water heater assembly that is configured to heat a flow of water using progressively higher grade heat from a multi-stage heat exchanger includes an inlet configured to receive a flow of condensate water from a relatively lower pressure heat exchanger positioned in the multi-stage heat exchanger. The water heater assembly also includes a plurality of water source heaters wherein each of the water source heaters includes a water flow path coupled in flow communication with a heat exchanger that is positioned within the multi-stage heat exchanger. The water heater assembly further includes a pump configured to boost the pressure of the flow of water through the water heater assembly to an outlet.

In yet another embodiment, a fuel heater assembly that is configured to heat a flow of fuel using water heated using progressively higher grade heat from a multi-stage heat exchanger includes a water heater assembly including an inlet configured to receive a flow of water from a relatively lower pressure heat exchanger positioned in the multi-stage heat exchanger, a plurality of water source heaters wherein each of the water source heaters includes a water flow path coupled in flow communication with a heat exchanger positioned within the multi-stage heat exchanger, and an outlet configured to channel the heated flow of condensate from the water heater assembly. The fuel heater assembly also includes a fuel heater including a first flow path coupled in flow communication with a flow of fuel wherein the fuel heater also includes a second flow path coupled in flow communication with the outlet. The fuel heater is configured to transfer heat from the flow of water to the flow of fuel.

BRIEF DESCRIPTION OF THE DRAWINGS

FIG. 1 is a schematic diagram of an exemplary combined cycle power generation system;

FIG. 2 is a schematic diagram of the water heater assembly shown in FIG. 1 in accordance with an exemplary embodiment of the present invention; and FIG. 3 is a schematic diagram of the water heater assembly shown in FIG. 1 in accordance with another exemplary embodiment of the present invention.

DETAILED DESCRIPTION OF THE INVENTION

The following detailed description illustrates embodiments of the invention by way of example and not by way of limitation. It is contemplated that the invention has general application to improving efficiency of combustion and power generation systems by using progressively higher grade heat to preheat a fuel flow to a combustor in industrial, commercial, and residential applications. As used herein high grade heat refers to heat at a relatively high temperature, low grade heat refers to heat at a relatively low temperature, and intermediate grade heat refers to heat at a temperature between that of low and high grade heat.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

Figure 1:
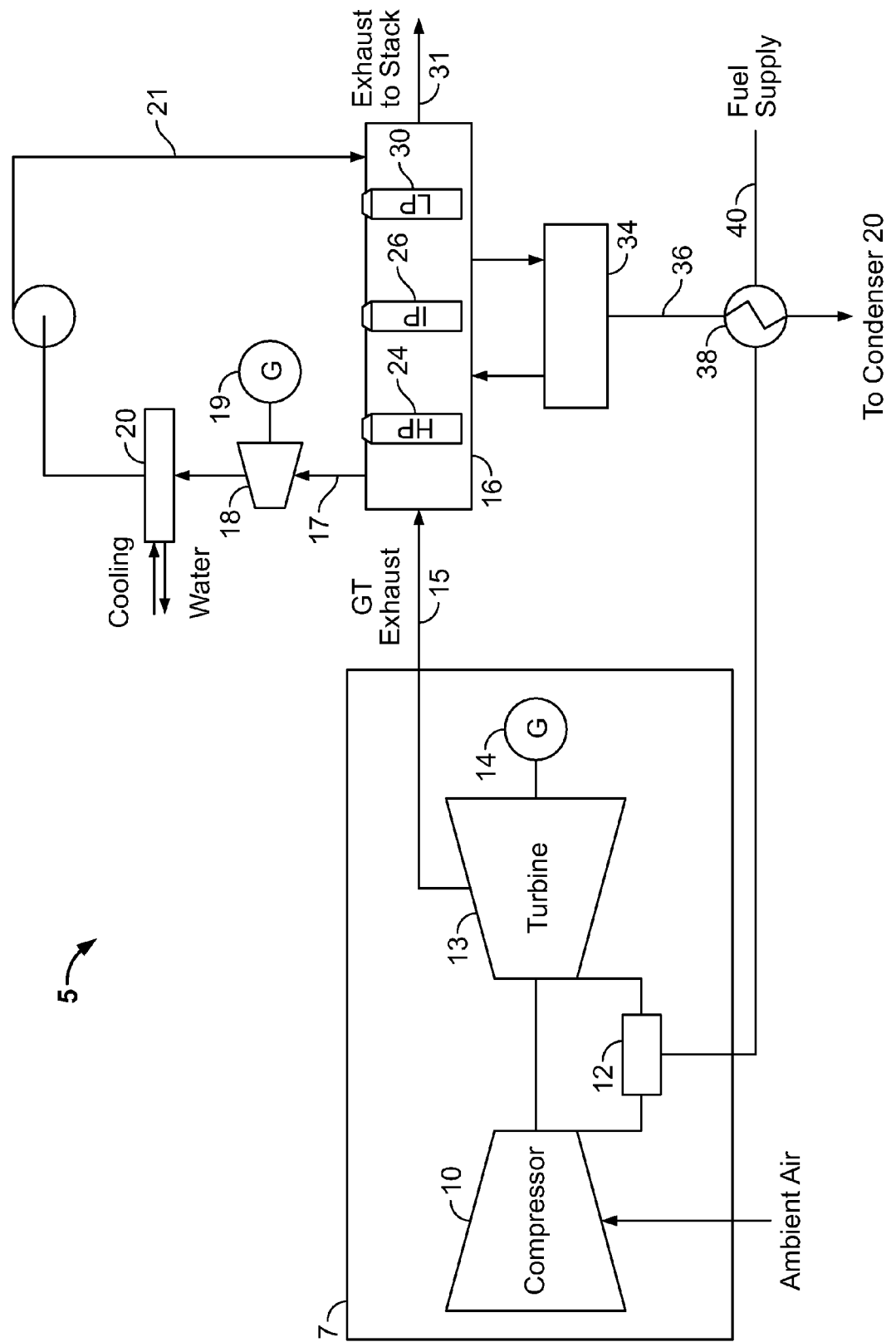
FIGS. 1-3 show exemplary embodiments of the system and assemblies described herein.

FIG. 1 is a schematic diagram of an exemplary combined cycle power generation system 5. Power generation system includes a gas turbine engine assembly 7 that includes a compressor 10, a combustor 12, and a turbine 13 powered by expanding hot gases produced in the combustor 12 for driving an electrical generator 14. Exhaust gases from the gas turbine 13 are supplied through conduit 15 to a heat recovery steam generator (HRSG) 16 for recovering waste heat from the exhaust gases. HRSG 16 includes high pressure (HP) section 24, intermediate pressure (IP) section 26, and low pressure (LP) section 30. HRSG 16 is configured to transfer progressively lower grade heat from exhaust gases to water circulating through each progressively lower pressure section. Each of the HP, IP, and LP sections 24, 26, and 30 may include an economizer, an evaporator, a superheater and/or feedwater or other pre-heaters associated with the respective section, such as but not limited to a high pressure section pre-heater, which may be split into multiple heat exchangers, which are then positioned in one or more of the sections (HP,IP,LP). The section economizer is typically for pre-heating water before it is converted to steam in for example, the evaporator.

Water is fed to the HRSG 16 through line 21 to generate steam. Heat recovered from the exhaust gases supplied to HRSG is transferred to water/steam in the HRSG 16 for producing steam which is supplied through line 17 to a steam turbine 18 for driving a generator 19. Line 17 represents multiple steam lines between the HRSG 16 and steam turbine 18 for the steam produced at different pressure levels. Cooled gases from the HRSG 16 are discharged into atmosphere via exit duct 31 and a stack (not shown).

In the exemplary embodiment, combined-cycle power plant 5 further includes a water heater assembly 34 positioned as a stand alone device separate from HRSG 16. In an alternative embodiment, water heater assembly 34 is positioned within HRSG 16. Water and/or steam are extracted from one or more sections of HRSG and channeled to water heater assembly 34. A flow of fuel heating water 36 is channeled from water heater assembly 34 to a fuel heater 38. A flow of fuel 40 is directed through fuel heater 38 where flow of fuel 40 receives heat transferred from flow of fuel heating water 36. The heated fuel is channeled to combustor 12. The cooled flow of fuel heating water 36 is directed to condenser 20.

Figure 2:
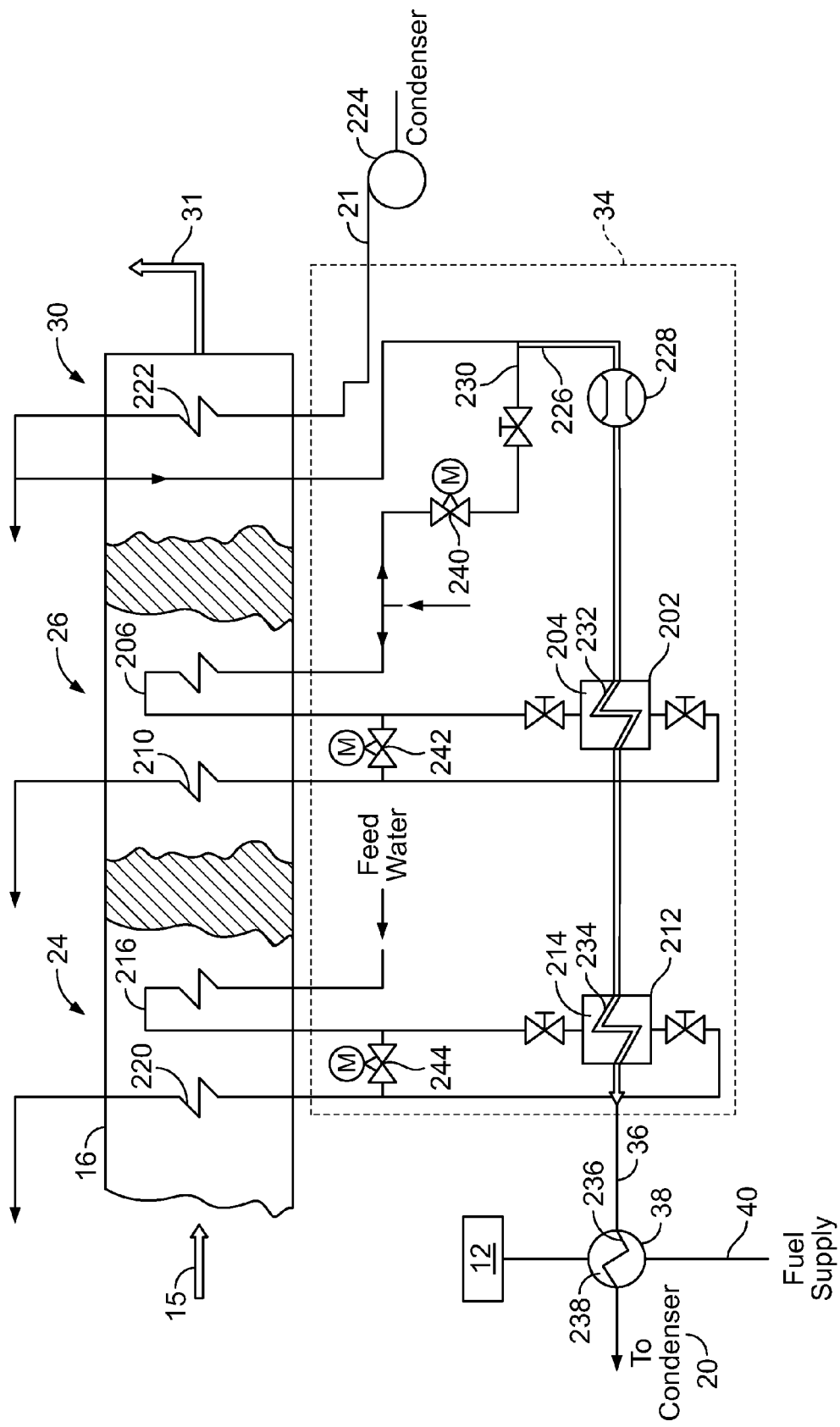

FIG. 2 is a schematic diagram of water heater assembly 34 (shown in FIG. 1) in accordance with an exemplary embodiment of the present invention. In the exemplary embodiment, water heater assembly 34 includes a first water source heater 202 having a first flow path 204 from an economizer 206 in IP section 26 exchanging heat with a second flow path 232 from an economizer 222 in the LP section 30. In one embodiment, a portion of the water flow from economizer 206 in IP section 26 is channeled to a second heat exchanger 210 upstream (economizer, evaporator or superheater) in the HRSG 16. Water heater assembly 34 further includes a second water source heater 212 exchanging heat between a first flow path 214 from economizer 216 in HP section 24 and a second flow path 234 from water source heater 202. In one embodiment, a portion of the water flow from economizer 216 in HP section 24 is channeled to a second heat exchanger 220 upstream (economizer, evaporator or superheater) in the HRSG 16. Low pressure economizer 222 receives a flow of condensate from a condensate pump 224 and directs a flow of heated condensate to a suction 226 of a booster pump 228 and to an inlet 230 to a water side of economizer 206 in IP section 26. Booster pump 228 pumps heated condensate water through a second flow path 232 of first water source heater 202, a second flow path 234 of second water source heater 212, and then through a first flow path 236 of fuel heater 38, where the heat in the heated condensate is transferred to flow of fuel 40 flowing through a second flow path 238 in fuel heater 38.

During operation, condensate water is heated through low pressure economizer 222, first water source heater 202, and second water source heater 212. The heated condensate water is directed to fuel heater 38 where heat is transferred from the heated condensate water to a flow of fuel flowing through second flow path 238. The amount of heat transferred to the fuel and thus the fuel temperature is controlled in one embodiment using bypass valves 240, 242, and 244. In the exemplary embodiment, fuel heater 38 comprises a single stage fuel heater that is used to improve the efficiency of system 5 by preheating the fuel to a preset temperature. By increasing the fuel inlet temperature to gas turbine combustor 12 the amount of fuel required for the combustion process to attain the required firing temperature is reduced and hence the overall efficiency of system 5 is also improved.

Figure 3:
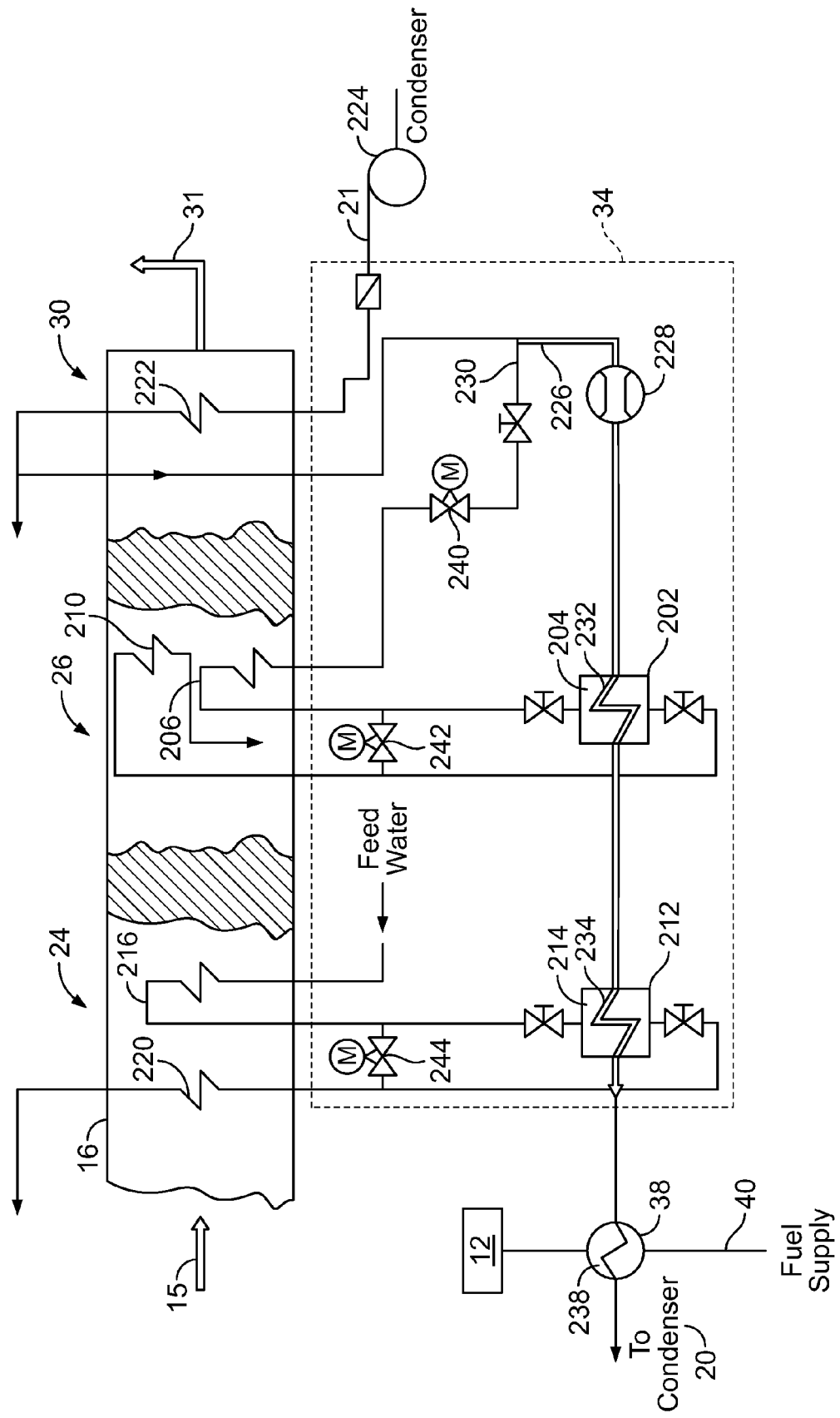

FIG. 3 is a schematic diagram of water heater assembly 34 (shown in FIG. 1) in accordance with another exemplary embodiment of the present invention. In the exemplary embodiment, HRSG 16 is configured with second heat exchanger 210 evenstream with first heat exchanger 206. As used herein, evenstream refers to a relative position within the same flow path of a conduit configured to channel a flow of fluid wherein components are neither substantially downstream nor substantially upstream with reference to each other, but rather are adjacent to each other in the flow path with respect to the direction of flow. Positioning first heat exchanger 206 evenstream with second heat exchanger 210 in HRSG 16 permits first heat exchanger 206 to be exposed to higher grade heat than when first heat exchanger 206 is downstream of second heat exchanger 210 (as shown in FIG. 2). Exposing first heat exchanger 206 to higher grade heat permits first heat exchanger 206 to provide more heat to water heater assembly 34.

The above-described embodiments of a system and assemblies for heating a flow of fuel provides a cost-effective and reliable means of improving the efficiency of the power generation system with fuel heating using water heated using progressively higher grade heat from a multi-stage heat exchanger arrangement. More specifically, the system and assemblies described herein facilitate improving the efficiency of the power plant by preheating the incoming fuel to a preset temperature. In addition, the above-described system and assemblies facilitate increasing the fuel inlet temperature to the gas turbine combustor such that the amount of fuel required from the combustion process to attain the required combustion temperature is reduced thereby improving the overall efficiency of the power generation cycle. As a result, the system and assemblies described herein facilitate increasing the efficiency of the power generation system in a cost-effective and reliable manner.

An exemplary system and assemblies for heating a flow of fuel using water heated using progressively higher grade heat from a multi-stage heat exchanger arrangement are described above in detail. The systems illustrated are not limited to the specific embodiments described herein, but rather, components of each may be utilized independently and separately from other components described herein. Each system component can also be used in combination with other system components.

While the disclosure has been described in terms of various specific embodiments, it will be recognized that the disclosure can be practiced with modification within the spirit and scope of the claims.

What is claimed is:

1. A fuel supply system comprising:
a water heater assembly configured to heat a flow of water using progressively higher grade heat from a multi-stage heat exchanger arrangement, said multi-stage heat exchanger including a low pressure economizer and an intermediate pressure economizer, said water heater assembly comprising:
a first water source heater coupled to the low pressure economizer for receiving a first flow of water from the low pressure economizer, and to the intermediate pressure economizer to transfer heat from a second flow of heated water received from the intermediate pressure economizer to the first flow of water; and
a second water source heater coupled to said first water source heater for receiving the first heated water from said first water source heater, said second water source heater configured to heat the first heated water received from said first water source heater;
a fuel inlet flow path configured to receive a flow of fuel; and
a fuel heater comprising a first flow path coupled in flow communication with said fuel inlet flow path, said fuel heater comprising a second flow path coupled in flow communication with said second water source heater for receiving the first heated water from said second water heater source, said fuel heater configured to transfer heat from the first heated water to the flow of fuel.

2. A system in accordance with claim 1 wherein said water heater assembly is configured to receive a flow of condensate water from the low pressure economizer.

3. A system in accordance with claim 2 wherein said multi-stage heat exchanger includes a high pressure economizer, said second water source heater comprises a flow path coupled in flow communication with the high pressure economizer.

4. A system in accordance with claim 3 wherein a temperature of the flow of fuel is controlled using a bypass flow around said second water source heater.

5. A system in accordance with claim 1 further comprising a booster pump coupled between said first water source heater and said low pressure economizer for channeling the first flow of water from the low pressure economizer to said first water source.

6. A system in accordance with claim 5 wherein a temperature of the flow of fuel is controlled using a bypass flow around said first water source heater.

7. A system in accordance with claim 1 wherein said multi-stage heat exchanger arrangement comprises an intermediate pressure section that includes the intermediate pressure economizer positioned downstream of at least one of an intermediate pressure evaporator and an intermediate pressure superheater in a direction of a gas flowpath through the multi-stage heat exchanger arrangement.

8. A system in accordance with claim 1 wherein said multi-stage heat exchanger arrangement comprises an intermediate pressure section that includes the intermediate pressure economizer in serial flow communication with at least one of an intermediate pressure evaporator and an intermediate pressure superheater.

9. A system in accordance with claim 1 wherein said multi-stage heat exchanger arrangement comprises a high pressure section that includes a high pressure economizer positioned downstream of at least one of a high pressure evaporator and a high pressure superheater in a direction of a gas flowpath through the multi-stage heat exchanger.

10. A system in accordance with claim 1 wherein said multi-stage heat exchanger comprises a high pressure section that includes a high pressure economizer in serial flow communication with a high pressure superheater.

11. A system in accordance with claim 1 wherein said multi-stage heat exchanger comprises an intermediate pressure section that includes the intermediate pressure economizer positioned adjacent to at least one of an intermediate pressure evaporator and an intermediate pressure superheater in a direction of a gas flowpath through the multi-stage heat exchanger.

12. A system in accordance with claim 11 wherein said intermediate pressure economizer is coupled in serial flow communication with said at least one of an intermediate pressure evaporator and an intermediate pressure superheater.

13. A system in accordance with claim 1 wherein said water heater assembly comprises a pump configured to boost the pressure of the flow of water through said water heater assembly and said second flow path of said fuel heater.

14. A water heater assembly configured to heat a flow of water using progressively higher grade heat from a multi-stage heat exchanger including a low pressure economizer and an intermediate pressure economizer, said water heater assembly comprising:
an inlet configured to receive a first flow of condensate water from the low pressure economizer;
a plurality of water source heaters each of said water source heaters comprising a water flow path coupled in flow communication with a heat exchanger positioned within the multi-stage heat exchanger, said plurality of water source heaters comprising:
a first water source heater coupled to the low pressure economizer and the intermediate pressure economizer, said first water source heater configured to transfer heat from a second flow of water received from the intermediate pressure economizer to the first flow of condensate water received from the low pressure economizer; and
a second water source heater coupled to said first water source heater for receiving the first flow of condensate water from said first water source heater, said second water source heater configured to heat the first flow of heated condensate water received from said first water source heater; and
a pump configured to boost the pressure of the flow of water through said water heater assembly to an outlet.

15. An assembly in accordance with claim 14 wherein a temperature of the first flow of condensate water at the outlet is controlled using a bypass flow around at least one of said plurality of water source heaters.

16. An assembly in accordance with claim 14 wherein said multi-stage heat exchanger comprises an intermediate pressure section that includes the intermediate pressure economizer positioned downstream of at least one of an intermediate pressure evaporator and an intermediate pressure superheater in a direction of a gas flowpath through the multi-stage heat exchanger.

17. An assembly in accordance with claim 14 wherein said multi-stage heat exchanger comprises an intermediate pressure section that includes the intermediate pressure economizer positioned adjacent to at least one of an intermediate pressure evaporator and an intermediate pressure superheater in a direction of a gas flowpath through the multi-stage heat exchanger.

18. A fuel heater assembly configured to heat a flow of fuel using water heated using progressively higher grade heat from a multi-stage heat exchanger including a low pressure economizer and an intermediate pressure economizer, said fuel heater assembly comprising:
a water heater assembly comprising:
an inlet configured to receive a first flow of condensate water from the low pressure economizer;
a plurality of water source heaters each of said water source heaters comprising a water flow path configured to be coupled in flow communication with a heat exchanger positioned within the multi-stage heat exchanger, said plurality of water source heaters comprising:
a first water source heater coupled to the low pressure economizer and the intermediate pressure economizer, said first water source heater configured to transfer heat from a second flow of water received from the intermediate pressure economizer to the first flow of condensate water received from the low pressure economizer; and
a second water source heater coupled to said first water source heater for receiving the first flow of heated condensate water from said first water source heater, said second water source heater configured to heat the first flow of heated condensate water received from said first water source heater; and
an outlet configured to channel the first flow of heated condensate from the water heater assembly; and
a fuel heater comprising a first flow path configured to be coupled in flow communication with a flow of fuel, said fuel heater comprising a second flow path configured to be coupled in flow communication with the outlet, said fuel heater configured to transfer heat from the first flow of heated condensate water to the flow of fuel.

19. A fuel heater assembly in accordance with claim 18 wherein said multi-stage heat exchanger comprises an intermediate pressure section that includes the intermediate pressure economizer positioned downstream of at least one of an intermediate pressure evaporator and an intermediate pressure superheater in a direction of a gas flowpath through the multi-stage heat exchanger.

20. A fuel heater assembly in accordance with claim 18 wherein said multi-stage heat exchanger comprises an intermediate pressure section that includes the intermediate pressure economizer positioned adjacent to at least one of an intermediate pressure evaporator and an intermediate pressure superheater in a direction of a gas flowpath through the multi-stage heat exchanger.

* * * * *